United States Patent Office 2,950,172
Patented Aug. 23, 1960

2,950,172

PRODUCTION OF COBALTOUS HYDROXIDE

John Pincott and De Witt H. West, Swansea, Wales, assignors to The International Nickel Company, Inc., New York, N.Y., a corporation of Delaware No Drawing. Filed Nov. 8, 1957, Ser. No. 695,206

Claims priority, application Great Britain Nov. 23, 1956

6 Claims. (Cl. 23—183)

The present invention relates to the production of cobaltous hydroxide, $Co(OH)_2$, and more particularly to a special method for producing cobaltous hydroxide which is crystalline, readily filterable and further characterized by the property of being resistant to oxidation and the adverse effects incident thereto.

Cobaltous hydroxide, $Co(OH)_2$, otherwise known as cobaltous hydrate, can be made by treating an aqueous solution of cobaltous sulphate, $CoSO_4$, with an excess of a caustic alkali, for example, caustic soda. A blue precipitate is first formed which goes pink when all the cobaltous hydroxide has been precipitated and there is an excess of alkali. The amount of excess alkali necessary to bring about this color change is dependent on the temperature, the higher the temperature the less being the excess of alkali required, and the reaction is therefore effected at or near the boiling point of the solution. The reaction is represented by the equation:

$$CoSO_4 + 2NaOH = Co(OH)_2 + Na_2SO_4$$

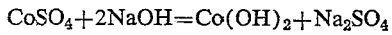

The precipitate is removed from the solution by filtration and is then washed and dried.

The precipitate of cobaltous hydroxide made in this way is gelatinous and rather difficult to filter and to wash free from impurities. More important, however, is the fact that it tends to oxidize to cobaltic hydroxide or to cobaltosic oxide $Co_3O_4$. This oxidation also occurs during treatment after precipitation and continues during storage of the dried product. Oxidation is accompanied by a darkening of the pink color of the pure cobaltous hydroxide to brown and then black, and has the effect of reducing the solubility of the hydroxide in the very weak acids in which it is normally dissolved for the manufacture of paint driers such as cobalt linoleate.

As is well known to those skilled in the art, the foregoing problems are of a somewhat complex nature since it is generally known that the presence of small amounts of foreign substances in solutions from which precipitation or crystallization of chemical substances takes place can greatly affect the form of the precipitate (amorphous or crystalline) or its crystal habit. The phenomenon is regarded as unpredictable.

Although attempts were made to overcome the foregoing difficulties and other disadvantages, none, as far as we are aware, was entirely successful when carried into practice commercially on an industrial scale.

It has now been discovered that if a small quantity of special dye materials is added to the solution from which the cobaltous hydroxide is precipitated, the cobaltous hydroxide separates out in a substantially crystalline form, is readily filterable and does not exhibit the tendency to undergo oxidation and darkening during further treatment and storage as in the case of cobaltous hydroxide prepared by prior art methods.

It is an object of the present invention to provide a process for preparing cobaltous hydroxide which is easily filterable and substantially crystalline in form.

Another object of the invention is to provide a process for preparing cobaltous hydroxide which does not undergo detrimental oxidation effects.

The invention also contemplates providing a process for producing cobaltous hydroxide which is substantially crystalline in form, is readily filterable and offers appreciable resistance to the detrimental influence of oxidation.

Other objects and advantages will become apparent from the following description.

Generally speaking, the present invention contemplates a special process for producing cobaltous hydroxide which comprises incorporating in an aqueous, cobaltous sulfate solution a small but effective amount up to about 0.1% by weight of the cobaltous sulfate of a dye selected from the group consisting of Eosin, Methylene Blue, Bismarck Brown, p-Nitroso-dimethylaniline, Neutral Red, Carmine, p-Carmine, Gentian Violet, Wright's Stain and the dye intermediate Resorcinol, and thereafter precipitating the cobaltous hydroxide from the cobaltous sulfate solution. In accordance with the present invention, a substantially crystalline and easily filterable cobaltous hydroxide is obtained which is substantially resistant to the deleterious influence of oxidation which hitherto adversely affected the solubility in acids of cobaltous hydroxide prepared by known methods, for example, in weak acids wherein cobaltous hydroxide is dissolved for the manufacture of paint driers. A relatively small proportion, e.g., 0.01%, of the aforementioned dye materials is effective to produce the desired results. In achieving highly satisfactory results, it is preferred to employ Eosin (Eosin Blue and Eosin Yellow both being highly satisfactory) as the dye material since, in addition to providing a crystalline easily filterable and oxidation resistant cobaltous hydroxide, it also enhances the desirable pink color of the precipitate.

In carrying the invention into practice, it is preferred to add between 0.1% and 0.01% of the dye by weight of the cobaltous sulphate. If the amount of dye added is too small, the precipitate formed will be only slightly improved so far as filtration is concerned, being partly crystalline and partly amorphous, and the resistance to oxidation will not be so satisfactory. If, on the other hand, too much dye is added, the precipitate becomes coarser and its rate of solution in organic substances having weak acidic reaction is much decreased. When Eosin is employed as the dye material, the optimum amount is about 0.05% although other amounts within the range of about 0.01% to 0.1% are also effective.

Most of the dye added to the solution remains in solution or is washed out of the precipitate during the washing operation. Only a very small proportion of the amount used is retained by the precipitate.

In the preparation of the cobaltous hydroxide of the invention, the aqueous cobaltous sulfate solution should preferably be as close to neutrality as possible. While excess acid does not adversely affect precipitation, it does require the equivalent of precipitating agent for its neutralization before precipitation of the cobaltous hydroxide can proceed. In any event, the pH of the cobaltous sulfate solution does not exceed a pH of 6.8. In carrying out the invention, the reaction should be carried out near the boiling point of the solution, since at the higher temperatures less precipitating agent is required to effect the color change from blue to pink, particularly in the latter stages of the process. Alkali agents such as sodium and potassium hydroxides are very satisfactory for use as precipitating agents.

For the purpose of giving those skilled in the art a better understanding of the invention or a better appreciation of the advantages of the invention, the following illustrative example is given.

Example I

Five hundred and sixty-two pounds of cobalt sulphate crystals were dissolved in 188 gallons of water and the solution heated to 95° C. Four and a half ounces of Eosin were then added in the proportion of 0.05% of Eosin by weight of the cobalt sulphate. A solution of 160 pounds of caustic soda dissolved in 160 gallons of water was then added as a spray from a sprinkler to the stirred sulphate solution over a period of 20 minutes. The precipitate was blue/pink in color and was converted entirely to pink by the addition of a slight excess of caustic soda (approximately 2 pounds as a 10% solution). Thereafter the excess alkali was removed by washing. The cobaltous hydroxide so produced is precipitated in a more readily filterable form which is crystalline and has a reduced tendency to undergo oxidation during further treatment and storage.

It is to be observed that the present invention provides a substantially oxidation-resistant and crystalline cobaltous hydroxide which is readily filterable. Moreover, because the cobaltous hydroxide produced in accordance with the invention is capable of resisting oxidation and the adverse characteristics normally associated with oxidation, it is markedly advantageous commercially because of its high solubility in acids, including weak organic acids. Furthermore, filtering time is advantageously reduced and other filtering difficulties are obviated. While cobaltous hydroxide may be used for many purposes, it is particularly useful in the manufacture of paint driers, e.g., cobalt linoleate.

Although the present invention has been described in conjunction with preferred embodiments, it is to be understood that modification and variations may be resorted to without departing from the spirit and scope of the invention, as those skilled in the art will readily understand. Such modifications and variations are considered to be within the purview and scope of the invention and appended claims.

We claim:

1. A process for producing pink cobaltous hydroxide which is substantially crystalline and non-gelatinous in form and being further characterized in that it is readily filterable and resists the tendency to undergo deleterious oxidation which comprises, establishing an aqueous cobaltous sulfate solution, adding to said solution a small but effective amount up to about 0.1% by weight of the cobaltous sulfate of a material selected from the group consisting of Eosin, Methylene Blue, Bismarck Brow, p-Nitroso-dimethylaniline, Neutral Red, Carmine, p-Carmine, Gentian Violet, Wright's Stain and Resorcinol, and thereafter adding an alkali agent to said solution to precipitate pink cobaltous hydroxide therefrom.

2. The process as described in claim 1 wherein the material is added in an amount from 0.01% to 0.1%.

3. A process as described in claim 1 wherein the alkali agent is selected from the group consisting of sodium hydroxide and potassium hydroxide.

4. A process for producing pink cobaltous hydroxide which is substantially crystalline and non-gelatinous in form and being further characterized in that it is readily filterable and resists the tendency to undergo deleterious oxidation which comprises establishing an aqueous cobaltous sulfate solution, adding to said solution about 0.01% to about 0.1% Eosin by weight of the cobaltous sulfate, and thereafter adding an alkali agent to said solution to precipitate pink cobaltous hydroxide therefrom.

5. The process as described in claim 4 wherein the Eosin is added in an amount of about 0.05% by weight of the cobaltous sulfate.

6. A process for producing pink cobaltous hydroxide which is substantially crystalline and non-gelatinous in form and being further characterized in that it is readily filterable and resists the tendency to undergo deleterious oxidation which comprises, establishing an aqueous cobaltous sulfate solution having a pH of not greater than pH 6.8, adding to said solution a small but effective amount up to 0.1% by weight of the cobaltous sulfate of a material selected from the group consisting of Eosin, Methylene Blue, Bismarck Brown, p-Nitroso-dimethylaniline, Neutral Red, Carmine, p-Carmine, Gentian Violet, Wright's Stain and Resorcinol, and thereafter adding an alkali agent to said solution to precipitate pink cobaltous hydroxide therefrom.

References Cited in the file of this patent

UNITED STATES PATENTS

| | | |
|---|---|---|
| 2,248,658 | Bogdan | July 8, 1941 |
| 2,360,283 | Rutherford | Oct. 10, 1944 |

OTHER REFERENCES

Hackh's Chemical Dictionary, second edition (1937), Blakiston's Son and Co., pages 189, 190, 345, 415, 590, 625, 807, 954 and 1004.

Mellor: Comprehensive Treatise on Inorganic and Theoretical Chemistry, vol. 14, 1935, pp. 567 to 570.